United States Patent
Bunch et al.

(10) Patent No.: US 9,908,309 B2
(45) Date of Patent: Mar. 6, 2018

(54) METHOD OF APPLICATION OF A DECORATION FILM

(75) Inventors: Steven R. Bunch, Hebron, IN (US); Huimin Yang, Glendale, WI (US)

(73) Assignee: CCL LABEL, INC., Framingham, MA (US)

(*) Notice: Subject to any disclaimer, the term of this patent is extended or adjusted under 35 U.S.C. 154(b) by 871 days.

(21) Appl. No.: 13/509,377

(22) PCT Filed: Nov. 16, 2010

(86) PCT No.: PCT/US2010/056858
§ 371 (c)(1),
(2), (4) Date: May 11, 2012

(87) PCT Pub. No.: WO2011/060425
PCT Pub. Date: May 19, 2011

(65) Prior Publication Data
US 2012/0222803 A1    Sep. 6, 2012

Related U.S. Application Data

(60) Provisional application No. 61/261,536, filed on Nov. 16, 2009.

(51) Int. Cl.
*B32B 37/10* (2006.01)
*B32B 27/08* (2006.01)
(Continued)

(52) U.S. Cl.
CPC ............ *B32B 27/08* (2013.01); *B29C 66/345* (2013.01); *B32B 25/08* (2013.01); *B32B 27/304* (2013.01);
(Continued)

(58) Field of Classification Search
None
See application file for complete search history.

(56) References Cited

U.S. PATENT DOCUMENTS

| 4,838,973 A | * | 6/1989 | Mentzer et al. | 156/212 |
| 5,080,742 A | * | 1/1992 | Takahashi | 156/212 |

(Continued)

FOREIGN PATENT DOCUMENTS

| EP | 2163381 | 3/2010 |
| WO | 2009/026147 | 2/2009 |

*Primary Examiner* — Barbara J Musser
(74) *Attorney, Agent, or Firm* — McDonald Hopkins LLC (57) ABSTRACT

In general, a decorative laminate construction (50, 60) is provided. In one embodiment, the construction (50) includes: a protective layer (12), the protective layer comprising a film having opposing first and second major surfaces; an embossing layer (20) formed over the second major surface of the protective layer, the embossing layer have opposing first and second major surfaces, the first major surface of the embossing layer being proximate the protective layer and the second major surface (22) of the embossing layer being distal from the protective layer, the second major surface of the embossing layer being embossed with a pattern such that features (22a, 22b) are produced on the second major surface of the embossed layer which are raised and lowered relative to one another; a metallization layer (30) formed over the second major surface of the embossing layer so as to achieve a visual effect by virtue of the metallization layer conforming to the features of the embossed pattern; and, a primer layer (32) formed over the metallization layer on a side thereof opposite the embossing layer. Also disclosed is a method for application of the decorative laminate construction to a part (80, 100) such that the decorative laminate construction wraps around multiple surfaces of the part.

22 Claims, 7 Drawing Sheets

(51) Int. Cl.
  *B32B 25/08* (2006.01)
  *B29C 65/00* (2006.01)
  *B32B 27/30* (2006.01)
  *B32B 27/36* (2006.01)
  *B32B 37/00* (2006.01)

(52) U.S. Cl.
  CPC .............. *B32B 27/36* (2013.01); *B32B 37/10* (2013.01); *B32B 37/003* (2013.01); *B32B 2037/1072* (2013.01); *B32B 2255/10* (2013.01); *B32B 2255/205* (2013.01); *B32B 2255/26* (2013.01); *B32B 2255/28* (2013.01); *B32B 2307/40* (2013.01); *Y10T 156/1028* (2015.01); *Y10T 428/24521* (2015.01)

(56) References Cited

U.S. PATENT DOCUMENTS

| | | | |
|---|---|---|---|
| 5,641,379 A * | 6/1997 | Cesano | 156/580 |
| 6,264,782 B1 * | 7/2001 | Oshima | B41M 3/14 156/235 |
| 2002/0003635 A1 | 1/2002 | Boswell et al. | |
| 2002/0018880 A1 * | 2/2002 | Young | 428/209 |
| 2003/0107709 A1 * | 6/2003 | Rodick | B32B 27/06 353/1 |
| 2003/0129343 A1 * | 7/2003 | Galkiewicz et al. | 428/40.1 |
| 2003/0203230 A1 | 10/2003 | Pellingra et al. | |
| 2004/0219366 A1 * | 11/2004 | Johnson | 428/423.1 |
| 2005/0214558 A1 | 9/2005 | Roddick | |
| 2006/0057392 A1 * | 3/2006 | Smillie et al. | 428/421 |
| 2008/0000583 A1 | 1/2008 | Steelman et al. | |
| 2008/0063863 A1 * | 3/2008 | Colella | B44C 1/1716 428/340 |

* cited by examiner

FIGURE 5

METHOD OF APPLICATION OF A DECORATION FILM

CROSS REFERENCE TO RELATED APPLICATIONS

The present application is a 371 of international Application No. PCT/US2010/056858, which was published in English on May 19, 2011, which claims priority to U.S. Provisional Application No. 61/261,536 filed Nov. 16, 2009 which is incorporated herein by reference in it.

BACKGROUND

The present inventive subject matter relates generally to the art of decorative films and their application. Particular relevance is found in connection with decorative films applied to electronic devices, and accordingly the present specification makes specific reference thereto. However, it is to be appreciated that aspects of the present inventive subject matter are also equally amenable to other like applications.

In-mold foils have been used to decorate surfaces of injection molded parts. Additionally, laminated films have been used for decoration in conventional thermoforming operations. Still another known technique for decorating parts is hydrographics (also known as also known as immersion printing or water transfer printing). However, many of the prior art decoration techniques have had certain limitations.

For example, in-mold foils are limited to decorating parts made of material suitable for injection molding, such as plastic parts. For example, metal parts typically cannot be decorated with conventional in-mold foils or associated techniques insomuch as metal parts are typically not injection molded. Thermoforming typically has to employ a separate mold or form to which the decorative laminate has to be conformed and inherently includes the additional thermoforming step. Using hydrographics partially employs wet chemistry and also has concern of waste water handling. Therefore, it can be inconvenient and/or impractical in some instances.

Accordingly, new and/or improved decoration films and/or laminates and/or methods for applying decorative films and/or laminates are disclosed which address the above-referenced problem(s) and/or others.

SUMMARY

In accordance with one embodiment, a decorative film and/or laminate construction essentially as described herein is provided.

In one suitable embodiment, a decorative laminate construction comprises: a protective layer, the protective layer comprising a film having opposing first and second major surfaces; an embossing layer formed over the second major surface of the protective layer, the embossing layer have opposing first and second major surfaces, the first major surface of the embossing layer being proximate the protective layer and the second major surface of the embossing layer being distal from the protective layer, the second major surface of the embossing layer being embossed with a pattern such that features are produced on the second major surface of the embossed layer which are raised and lowered relative to one another; a metallization layer formed over the second major surface of the embossing layer so as to achieve a visual effect by virtue of the metallization layer conforming to the features of the embossed pattern; and, a primer layer formed over the metallization layer on a side thereof opposite the embossing layer. In another embodiment, the decorative laminate construction further comprises an adhesive layer formed on a backside of the laminate construction. This adhesive layer may be applied to the primer layer.

In accordance with another embodiment, a method as essentially described herein is provided for applying a decorative film and/or laminate construction to one or more surfaces of a part.

In one suitable embodiment, the method includes the steps of: supporting a part on a work surface; supporting a decorative laminate construction adjacent a first surface of the part without contacting the part; forcing the decorative laminate construction into contact with a first portion of the first surface of the part while a remaining portion of the first surface of the part is not contacted by the decorative laminate construction; progressively contacting the remaining portion of the first surface of the part with the decorative laminate construction; and, wrapping the decorative laminate construction around the part to contact a second surface of the part with the decorative laminate construction, the second surface being different from the first surface.

Numerous advantages and benefits of the inventive subject matter disclosed herein will become apparent to those of ordinary skill in the art upon reading and understanding the present specification.

BRIEF DESCRIPTION OF THE DRAWING(S)

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

FIGS. 1-A through 1-F are diagrammatic illustrations showing an exemplary decorative laminate construction at various stages in the manufacture thereof in accordance with aspects of the present inventive subject matter.

FIGS. 3-A through 3-D are diagrammatic illustrations showing various stages in an exemplary process for applying a decorative film or laminate to a part according to one embodiment of the present inventive subject matter.

FIGS. 4-A through 4-C are diagrammatic illustrations showing various stages in another exemplary process for applying a decorative film or laminate to a part according to another embodiment of the present inventive subject matter.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Figure 1:
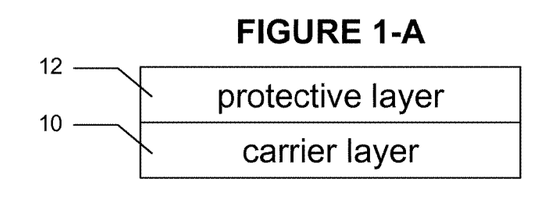

With reference now to FIG. 1-A, in one suitable embodiment, a suitable decorative film or laminate is manufactured by providing a first carrier layer 10 which carries a protective layer 12. For example, suitably the protective layer 12 is a PVDF (Polyvinylidene Fluoride) film or other like film exhibiting high weatherability or similar protective properties and the carrier layer 10 is a polyester film or polyethylene terephthalate (PET). In one exemplary embodiment, an approximately 1 mil thick PVDF film is top coat extruded to an approximately 2 mil thick PET film. In another exemplary embodiment, an approximately 1 mil thick PVDF film is solvent coated or cast onto an approximately 2 mil thick PET film.

As shown in FIG. 1-B, an embossing layer 20 is then applied to the protective layer 12. Suitably, a primer coat or the like of acrylic or another suitable resin is applied to the protective layer 12, e.g., via a gravure press, and dried to form the embossing layer 20. In one exemplary embodiment, the coat weight for forming the embossing layer 20 is about 3 g/m$^2$ and the coating may optionally be clear or tinted.

With reference now to FIG. 1-C, a desired design is then embossed into a surface 22 of the embossing layer 20, thereby selectively forming a pattern of raised portions (i.e., peaks and/or ridges) 22a and lowered portions (i.e., depressions and/or valleys) 22b in the surface 22. The embossed design, e.g., may optionally be patterned to produce a desired holographic or other like image or effect in the finished decoration.

Next, with reference to FIG. 1-D, an optional thin metallization layer 30 is applied to the embossed surface 22 of the embossing layer 20. For example, the metallization layer 30 is optionally created by vapor deposition of a thin layer of aluminum (Al) or other like metal or metal alloy on the surface 22. Suitably, the metallization layer 30 is less than or equal to about 320 angstroms in thickness. In one exemplary embodiment, the thickness of the metallization layer 30 is less than or equal to about 320 angstroms and greater than or equal to about 70 angstroms. In yet another embodiment, the thickness of the metallization layer 30 is less than or equal to about 160 angstroms and greater than or equal to about 75 angstroms. In still a further embodiment, the metallization layer 30 is less than or equal to about 140 angstroms and greater than or equal to about 90 angstroms. Suitably, e.g., as measured on a RD914 Macbeth density reading machine, the metallization layer 30 has an optical density of less than or equal to about 1.0 and greater than or equal to about 0.2. In another exemplary embodiment, the metallization layer 30 has an optical density less than or equal to about 0.75 and greater than or equal to about 0.3, and in still another embodiment less than or equal to 0.6 and greater than or equal to about 0.4.

As shown in FIG. 1-E, one or more primer coats of acrylic or another suitable resin are applied to the metallization layer 30 and dried to build up a layer 32 covering the metallization layer 30. In one exemplary embodiment, these coats are applied with a gravure press or the like. Suitably, two such primer coats are employed to build up the desired thickness of the layer 32, e.g., each coat being applied at a coat weight of about 3 g/m$^2$. The primer coats may be chosen for their material characteristics, including but not limited to processing temperature lower than the softening point of the embossing surface 22 and/or for adhesion to subsequent layers, e.g., such as ABS (Acrylonitrile Butadiene Styrene) or metals.

With reference now to FIG. 1-F, the construction from FIG. 1-E is then laminated to a substrate 40 of thermoformable material, e.g., such as ABS. Suitably, the lamination is executed with heat and pressure to join the construction from FIG. 1-E to a 20 mil thickness of ABS thereby completing the final laminate construction 50.

The finished construction illustrated in FIG. 1-F is suitable for thermoforming into a three-dimensional (3D) or other desired shape. Importantly, the holographic or other like effect produced on the embossed surface 22 is not significantly degraded by the thermoforming process. Notably, this lack of significant degradation can be attributed at least in part to having a sufficiently thin and/or uniform metallization layer 30. In contrast to a relatively thick metallization layer that would tend to break and/or crack upon being bent or otherwise formed into a 3D shape, a relatively thin metallization layer tends to break or crack less. Moreover, with a relatively thin metallization layer as proposed herein any breaks or cracks that do form as a result of the thermoforming process would tend to be relatively smaller and/or otherwise less apparent to the naked eye or similar detection means. Conversely, the lower limit on the thickness of the metallization layer 30 is also significant. That is to say, having a sufficiently thick metallization layer 30 is important to achieving the desired holographic image or effect. Should the thickness of the metallization layer 30 be too low, the holographic image or effect that is desired may not be suitably apparent. In another embodiment, the thermoforming layer is protected by encapsulation of other polymers which protect the embossing layer from deformation in subsequent processes.

Figure 2:
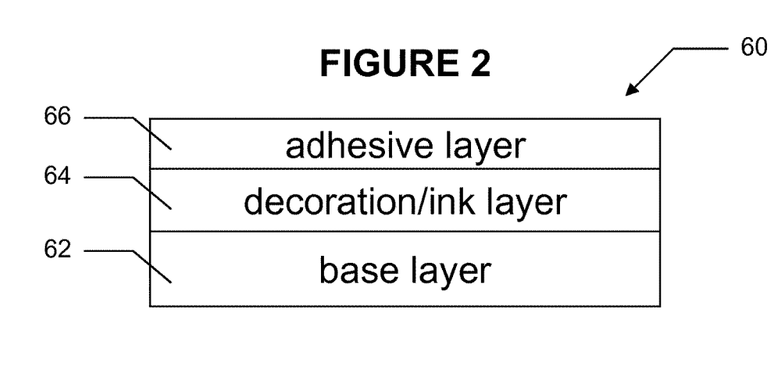
FIG. 2 is diagrammatic illustration showing an exemplary film and/or laminate construction suitable for decorating a part in accordance with aspects of the present inventive subject matter.

In another embodiment, as illustrated in FIG. 2, a decorative laminate 60 is constructed of a base film 62, a decorative or ink layer 64 and an adhesive layer 66. For example, in one exemplary embodiment, the base film 62 is made from an acrylic, nylon, olefin or optionally any other suitable thermoformable material. This film may optionally be micro-perforated to allow for air egress. A desired design or pattern, e.g., of one or more inks, is printed or otherwise applied, e.g., via a gravure press, to the base film 62 and dried to form the decorative layer 64. Thereafter, the adhesive layer 66 is coated on top of the decorative layer 64 and dried. Suitably, the adhesive forming the adhesive layer 66 is a PSA (Pressure Sensitive Adhesive) or a heat activated adhesive, and may be, e.g., a polyurethane based adhesive. Optionally the adhesive layer may be patterned to allow for air egress. In this way, the laminate 60 is thus constructed.

In yet another suitable embodiment, the decorative layer 64 may comprise one or more of the layers from the laminate construction 50. For example, any one or more of layers 20 through 32 may be used to create a decorative laminate 60 with a holographic or other like image or effect.

Suitably, a film or laminate, e.g., such as the laminate 50 or 60, is used to decorate one or more distinct sides of a multi-surface 3D part. Each surface or side may be a substantially planar surface, a curved surface, a complex-curved surface (i.e., curving in more than one direction of curvature) or a combination thereof. Optionally, the part may be a magnesium alloy or other metal part, e.g., such as the cover or case of a laptop computer or cover or housing for some other electronic device. In one exemplary embodiment, a laminate, e.g., such a the laminate 50, is first thermoformed, e.g., via a mold, to match the desired shape and/or surface of the part being decorated. Alternately, a film or laminate, e.g., such as the laminate 60, is applied using one or more of the techniques described below. It is to be appreciated, however, that while the laminates 50 and 60 have been illustrated and referenced in connection with the foregoing described embodiments, other similar laminate constructions and/or films may likewise be used in accordance with the described methods and/or processes that follow.

Figure 3:
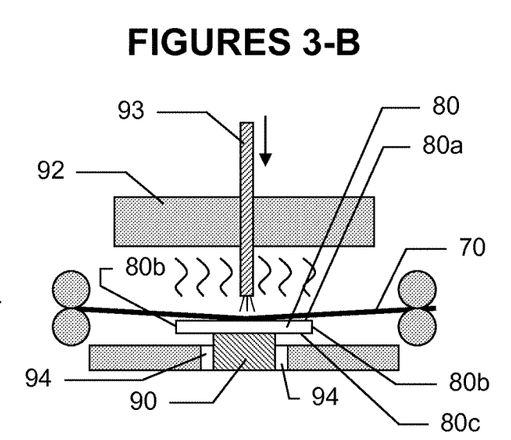

For example, FIG. 3-A shows a decorative laminate or film 70 being stretched or otherwise held over and/or slightly above a part 80 which is to be decorated. Suitably, the laminate or film 70 may have a construction similar to that of laminate 60. In the illustrated embodiment, the part 80 rests or is held on a raised work platform or pedestal 90.

As illustrated, a heater 92 applies heat to the laminate/film 70, e.g., to soften the same thereby allowing it to better conform to the part 80 and/or to activate an optionally heat activated adhesive on the side of the laminate/film 70 facing the part 80. Optionally, the surface or surfaces of the part 80 to be decorated are primed with epoxy or the like to facilitate bonding or adhering of the decoration laminate/film 70 to the primed surfaces. In one exemplary embodiment, the part 80 may be hot or heated to provide and/or assist in the above mentioned softening of the laminate/film 70 and/or activation of the adhesive.

In a next step, a nozzle 93 of a blower (not shown) is brought into close proximity of the laminate/film 70, e.g., as shown in FIG. 3-B. Suitably, the nozzle 93 is centrally positioned relative to a top surface 80a of the part 80. The blower is then activated to blow compressed air from the nozzle 93 onto the laminate/film 70 thereby urging a central area or region of the laminate/film 70 into contact with the top surface 80a of the part 80. Suitably, due to the relative closeness of the nozzle 93 to the laminate/film 70 and/or the part 80, the jet of compressed air therefrom acts primarily only on the central area or region of the top surface 80a and not at the periphery thereof. That is to say, due at least in part to the relative proximity of the nozzle 93, the pressure from the air flow is initially constrained to a central area or region so that a middle portion of the laminate/film 70 is urged or forced into contact with the top surface 80a of the part 80 while at a periphery the laminate/film 70 remains spaced apart from the top surface 80a of the part 80.

As shown in FIG. 3-C, the nozzle 93 is then progressively withdrawn or moved away from the laminate/film 70. Accordingly, the effective pressure of the air flow from the nozzle 93 progressively spreads laterally outward from the central area or region to thereby progressively urge or force the laminate/film 70 at a periphery region into contact with the top surface 80a of the part 80. In this manner, the laminate/film 70 is first contacted with the central area or region of the top surface 80a of the part 80, and then moving laterally outward therefrom toward the periphery of the top surface 80a of the part 80, the laminate/film 70 is progressively brought into contact with the top surface 80a of the part 80. Accordingly, entrapment of air pockets or air bubbles between the laminate/film 70 and the top surface 80a of the part 80 is minimized insomuch as the laminate/film 70 is applied from the inside-out thereby leaving an avenue open for air egress from between the laminate/film 70 and the top surface 80a of the part 80.

Finally, as shown in FIG. 3-D, a vacuum is drawn via vacuum channels 94 arranged at or near a base of the pedestal 90. Accordingly, the laminate/film 70 is drawn around the sides or edge surfaces 80b and onto the underside or bottom surface 80c of the part 80 thereby contacting the same. In this manner, the laminate/film 70 is wrapped 180 degrees around the part 80 and adhered to multiple surfaces (i.e., surfaces 80a, 80b and 80c) of the part 80.

Figure 4:
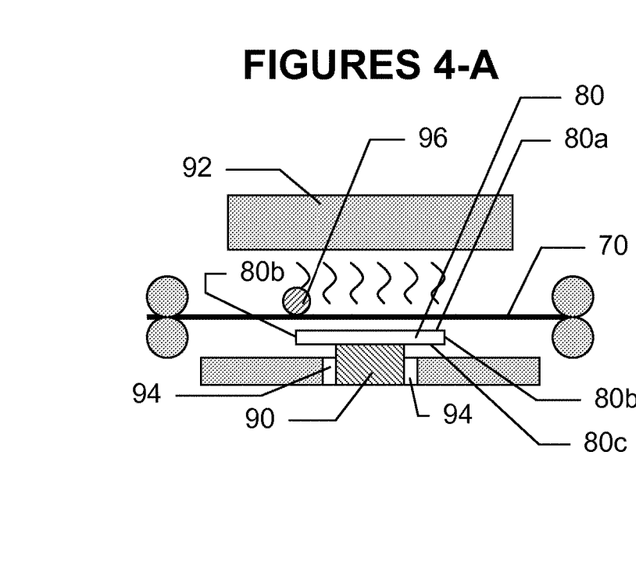

FIGS. 4-A through 4-C illustrate yet another exemplary embodiment for applying the decorative laminate/film 70 to the part 80. In this embodiment, a press roller 96 is used to apply the laminate/film 70 to the top surface 80a of the part 80. More specifically, FIG. 4-A shows the decorative laminate or film 70 being stretched or otherwise held over and/or slightly above the part 80 which is to be decorated. Suitably, the laminate or film 70 may have a construction similar to that of laminate 60. In the illustrated embodiment, the part 80 rests or is held on the raised work platform or pedestal 90.

As illustrated, the heater 92 applies heat to the laminate/film 70, e.g., to soften the same thereby allowing it to better conform to the part 80 and/or to activate an optionally heat activated adhesive on the side of the laminate/film 70 facing the part 80. Optionally, the surface or surfaces of the part 80 to be decorated are primed with epoxy or the like to facilitate bonding or adhering of the decoration laminate/film 70 to the primed surfaces. In one exemplary embodiment, the part 80 may be hot or heated to provide and/or assist in the above mentioned softening of the laminate/film 70 and/or activation of the adhesive.

In a next step, the roller 96 is brought into contact with the laminate/film 70, e.g., as shown in FIG. 4-B. Suitably, the roller 96 urges or forces the laminate/film 70 into contact with the top surface 80a of the part 80 along a first edge thereof while leaving the rest of the laminate/film 70 spaced apart from the remainder of the top surface 80a of the part 80. The roller 96 is then advanced, e.g., in the direction indicated by the arrow 96a, relative to the laminate/film 70 and/or top surface 80a of the part 80, thereby urging and/or forcing the rest of the laminate/film 70 into contact with the remainder of the top surface 80a of the part 80, e.g., as seen in FIG. 4-C. In this manner, the laminate/film 70 is first contacted with one edge of the top surface 80a of the part 80, and then moving laterally therefrom toward the opposite edge of the top surface 80a of the part 80, the laminate/film 70 is progressively brought into contact with the top surface 80a of the part 80. Accordingly, entrapment of air pockets or air bubbles between the laminate/film 70 and the top surface 80a of the part 80 is again minimized insomuch as the laminate/film 70 is applied from one edge to the other thereby leaving an avenue open for air egress from between the laminate/film 70 and the top surface 80a of the part 80.

Finally, as shown in FIG. 4-C, a vacuum is drawn via the vacuum channels 94 arranged at or near the base of the pedestal 90. Accordingly, the laminate/film 70 is drawn around the sides or edge surfaces 80b and onto the underside or bottom surface 80c of the part 80 thereby contacting the same. In this manner, the laminate/film 70 is wrapped 180 degrees around the part 80 and adhered to multiple surfaces (i.e., surfaces 80a, 80b and 80c) of the part 80.

Figure 5:
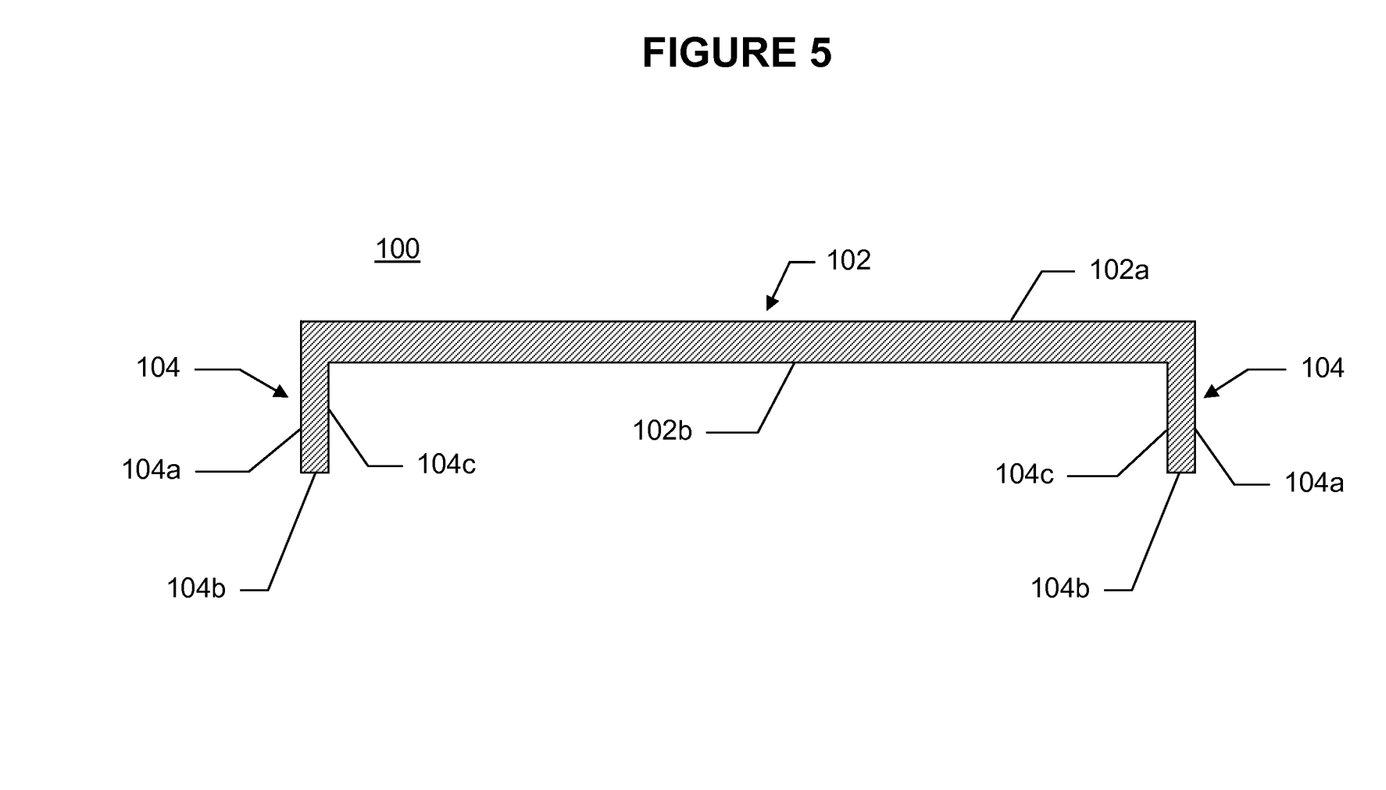
FIG. 5 is diagrammatic illustration showing a cross-section view of an exemplary part having a peripheral lip which is suited to application of a decorative film or laminate in accordance with an embodiment of the present inventive subject matter.
Figure 6:
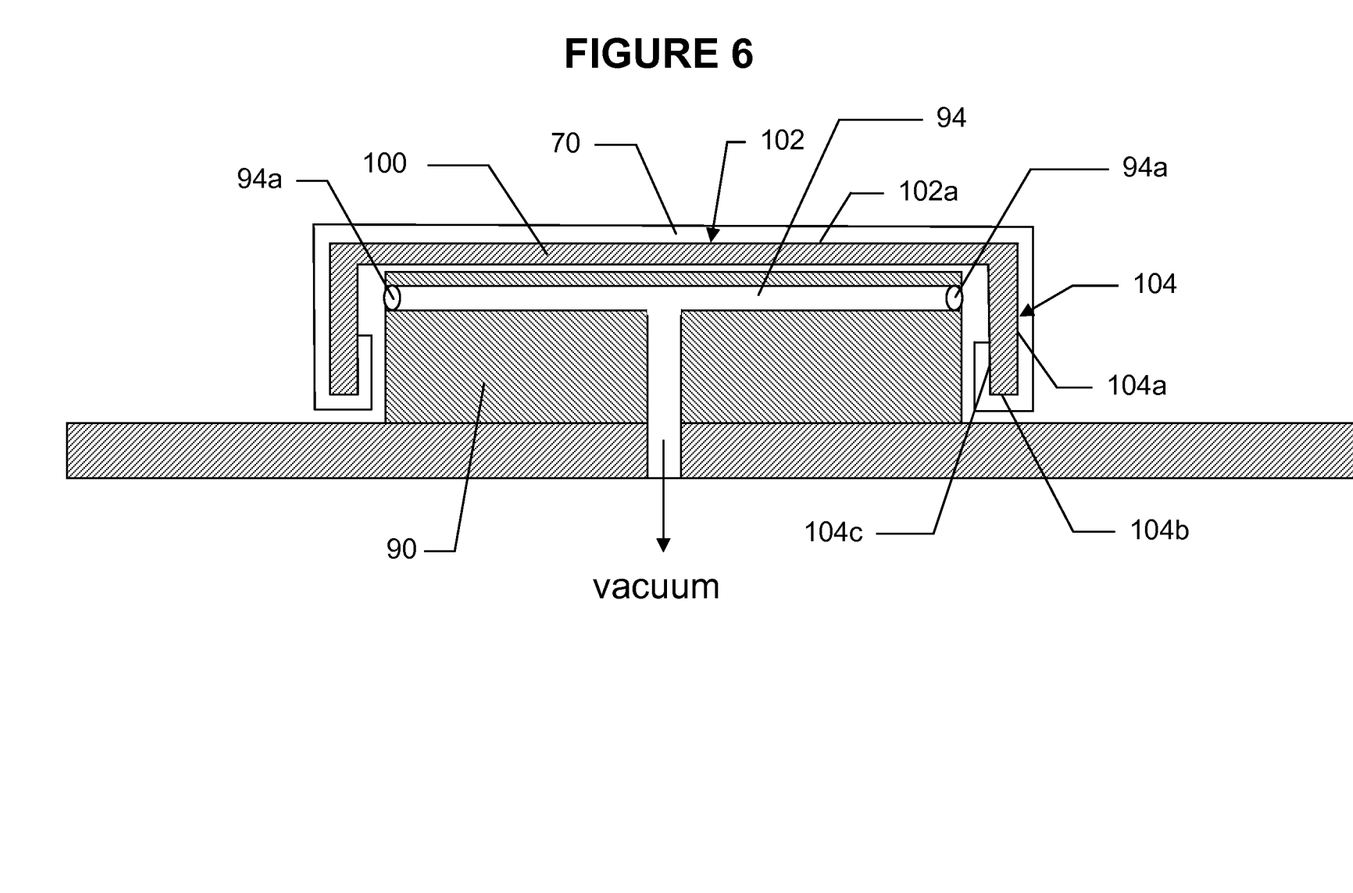
FIG. 6 is diagrammatic illustrations showing another exemplary process in accordance with aspects of the present inventive subject matter for applying a decorative film or laminate to the part shown in FIG. 5.

FIG. 5 shows an alternate configuration of the part being decorated, which has been re-number for purposes of this example but is nonetheless similar to the part 80 except as otherwise noted. In this case, the part 100 has a lip 104 at its edge or periphery. In particular, the part 100 has a top portion 102 (including an upper surface 102a and a lower surface 102b) that is bounded by the lip 104 at the periphery thereof. As shown, the lip 104 is defined by a wall which extends essentially transverse from the top portion 102 and includes an exterior facing surface 104a and an interior facing surface 104c that are joined by a lower edge surface 104b. As is to be appreciated, it is at times desirable to decorate all four surfaces (i.e., surfaces 102a, 104a, 104b and 104c) by wrapping a suitable laminate and/or film (e.g., the laminate/film 70) 270 degrees around the part 100. In this case, the pedestal and/or vacuum arrangement is altered from that illustrated in FIGS. 3 and 4. More specifically, as shown in FIG. 6, the vacuum channels 94 now extend up through the pedestal 90 and out to openings 94a arranged about the periphery of the pedestal 90 at or near a top portion thereof upon which the part 100 is held and/or otherwise supported. Notably, the lip 104 of the part 100 extends below the openings 94a. Accordingly, when a vacuum is drawn through the channels 94, the laminate/film 70 is drawn up and into contact with the surface 104c.

In practice, the laminate/film 70 is optionally first brought into contact with and/or adhered to the top surface 102a of the part 100 in essentially the same manner as previously described with reference to FIGS. 3 and/or 4. A vacuum is then drawn through the vacuum channels 94. Accordingly, the laminate/film 70 is pulled down over the outer surface 104a of the lip 104, across the lower edge surface 104b and up the inside surface 104c, making contact with and/or adhering to each surface in turn. In this manner, the laminate or film 70 is wrapped 270 degrees around and adhered to multiple surfaces (namely, surfaces 102a, 104a, 104b and 104c) of the part 100.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for applying a decorative laminate construction to a part, said method comprising:
    (a) supporting a part on a work surface;
    (b) supporting a decorative laminate construction adjacent a first surface of the part without contacting the part;
    (c) forcing the decorative laminate construction into contact with a first portion of the first surface of the part while a remaining portion of the first surface of the part is not contacted by the decorative laminate construction by arranging a nozzle next to a localized portion of the decorative laminate construction which corresponds to the first portion of the first surface of the part, and blowing air through the nozzle at the decorative laminate construction such that the localized portion of the decorative laminate construction is forced into contact with the first portion of the first surface of the part;
    (d) progressively contacting the remaining portion of the first surface of the part with the decorative laminate construction by progressively increasing a relative distance between the nozzle and the decorative laminate construction while continuing to blow air through the nozzle such that an effective force of the blowing air progressively spreads to a wider area across the decorative laminate construction; and,
    (e) wrapping the decorative laminate construction around an edge of the part to contact a second surface of the part with the decorative laminate construction, said second surface being different from the first surface.

2. The method of claim 1, further comprising:
    (f) wrapping the decorative laminate construction further around another edge of the part to contact a third surface of the part with the decorative laminate construction, said third surface being different from the first and second surfaces.

3. The method of claim 2, further comprising:
    (g) wrapping the decorative laminate construction further around yet another edge of the part to contact a fourth surface of the part with the decorative laminate construction, said fourth surface being different from the first, second and third surfaces.

4. The method of claim 3, wherein steps (e)-(g) are performed by creating a vacuum which pulls the decorative laminate construction around the part.

5. The method claim 1, further comprising:
    heating at least one of the part and the decorative laminate construction.

6. The method of claim 1, wherein the decorative laminate construction comprises:
    a protective layer, said protective layer comprising a film having opposing first and second major surfaces;
    an embossing layer formed over the second major surface of the protective layer, said embossing layer have opposing first and second major surfaces, said first major surface of the embossing layer being proximate the protective layer and said second major surface of the embossing layer being distal from the protective layer, said second major surface of the embossing layer being embossed with a pattern such that features are produced on the second major surface of the embossed layer which are raised and lowered relative to one another;
    a metallization layer formed over the second major surface of the embossing layer so as to achieve a visual effect by virtue of the metallization layer conforming to the features of the embossed pattern;
    a primer layer formed over the metallization layer on a side thereof opposite the embossing layer; and
    a carrier layer that carries the protective layer thereon such that the first major surface of the protective layer is in physical contact with the carrier layer and the second major surface of the protective layer is distal from the carrier layer.

7. The method of claim 6, wherein the protective layer is a polyvinylidene fluoride film.

8. The method of claim 6, wherein the embossing layer is formed from an acrylic resin.

9. The method of claim 6, wherein the primer layer is formed from an acrylic resin.

10. The method of claim 6, wherein the metallization layer is formed from aluminum.

11. The method of claim 6, wherein the metallization layer has a substantially uniform thickness less than or equal to 320 angstroms.

12. The method of claim 6, wherein the metallization layer has a substantially uniform thickness less than or equal to 160 angstroms and greater than or equal to 75 angstroms.

13. The method of claim 6, wherein the metallization layer has a substantially uniform thickness less than or equal to 140 angstroms and greater than or equal to 90 angstroms.

14. The method of claim 6, wherein the metallization layer has an optical density less than or equal to 1.0 and greater than or equal to 0.2.

15. The method of claim 6, wherein the metallization layer has an optical density less than or equal to 0.75 and greater than or equal to 0.3.

16. The method of claim 6, wherein the metallization layer has an optical density less than or equal to 0.6 and greater than or equal to 0.4.

17. The method claim 6, wherein the visual effect is a holographic effect.

18. The method of claim 6, further comprising:
a thermoforming layer formed over the primer layer on a side thereof opposite the metallization layer.

19. The method of claim 18, wherein the thermoforming layer is formed from acrylonitrile butadiene styrene.

20. The method of claim 6, wherein the carrier layer is a polyester or polyethylene terephthalate film.

21. The method of claim 6, further comprising:
an adhesive layer formed on a backside of the laminate construction.

22. The method of claim 21, wherein the adhesive layer is formed from a pressure sensitive adhesive or a heat activated adhesive.

* * * * *